Patented Oct. 14, 1941

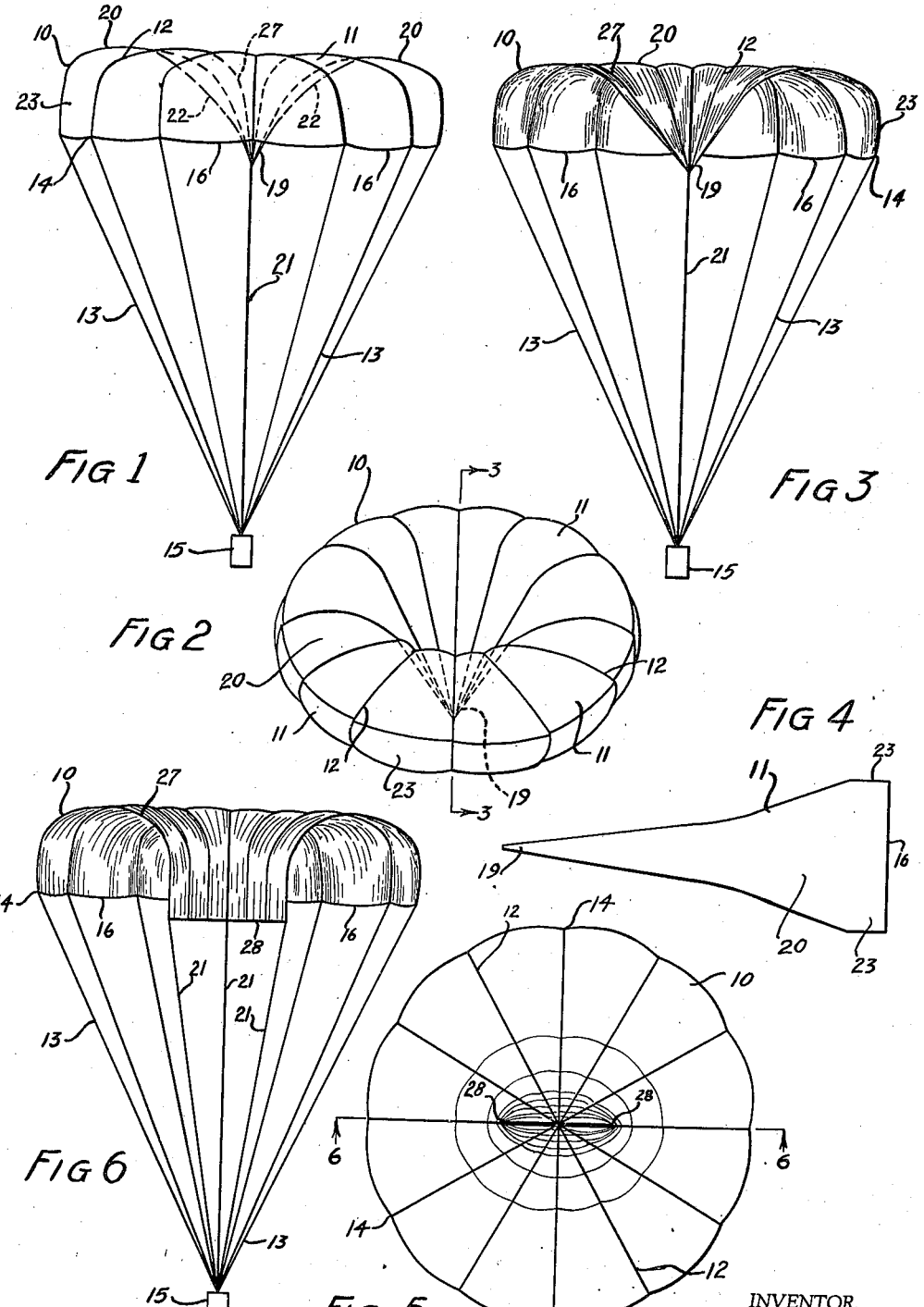

2,258,797

UNITED STATES PATENT OFFICE 2,258,797

PARACHUTE

John Overbeke, Cleveland Heights, Ohio

Application September 15, 1938, Serial No. 230,077

4 Claims. (Cl. 244—142)

My invention relates to parachutes.

An object of my invention is to provide a parachute which is more certain to open than those used heretofore.

Another object of my invention is to provide a quicker opening parachute.

Another object of my invention is to provide a parachute which does not severely jerk a body when the parachute opens up.

Another object of my invention is to provide a parachute with elastic means to attach the body to the spread of material thereby eliminating much of the shock due to the very rapid deceleration of the body caused by the opening of the parachute.

Another object of my invention is to provide a parachute with a central attaching means to help suspend the body.

Another object of my invention is to eliminate the initial opening shock by attaching the body to the parachute by means which are substantially shorter than the peripheral attaching means.

Another object of my invention is to attach the body to the parachute at the apex of a substantially conical central portion thereby more evenly and widely distributing the initial opening shock and the subsequent dead weight of the suspended body throughout the spread of material thereby greatly reducing dangerous high strain concentrations along the peripheral edge and in the center of the parachute.

Another object of my invention is to provide a parachute which opens rapidly but allows a portion of the air under the spread of material to escape under the peripheral edge of the parachute thereby introducing an initial cushioning effect as the parachute opens up.

Still another object of my invention is to provide a keel for a parachute thereby preventing uncontrolled turning and spinning while in the air and allowing an operator a greater degree of control over the parachute than has hitherto been attained.

Another object of my invention is to provide a conical or wedge shaped projection in the center of the spread of material which will cut through the air as the parachute descends toward the ground and direct the flow of air toward the peripheral edge of the parachute where it will strike the downwardly turned edge and force the parachute to stretch out to its greatest width.

Another object of my invention is to provide a spread of material which will spread sidewise and increase its diameter as it moves through air instead of bulge in the center and thereby pull its sides in.

Another object of my invention is to provide a parachute with a wedge which directs the stream of air rushing upwardly with respect to the parachute into the partially open folds of the peripheral edge thereby forcing the parachute to open.

Another object of my invention is to provide a parachute having a central wedge portion with central shroud lines attached thereto and to the outside edge of the parachute in such a manner that the initial shock of opening the parachute is transmitted by the central shroud lines to the central wedge portion thereby momentarily deforming the parachute causing a shock absorbing effect.

Another object of my invention is to provide a parachute having control means whereby the operator may govern the rate of speed of his descent.

Another object of my invention is to provide a parachute which will not drag the operator across the ground after he has landed.

Another object of my invention is to provide a center shroud line on which the operator may pull thereby causing a central portion of the canopy to move toward the operator thereby spilling some of the air out of the parachute to govern the rate of speed of his descent.

Another object of my invention is to provide a parachute with a center shroud on which the operator may pull after he has landed on the ground thereby allowing the wind to blow the peripheral edge away from the operator until the canopy can no longer hold air and therefore collapses to the ground.

Other objects and a fuller understanding of my invention may be had by referring to the following description and claims, taken in conjunction with the accompanying drawing, in which like parts are designated by like reference characters, and in which:

Figure 1 is a side elevation of a parachute embodying the features of my invention;

Figure 2 is a top isometric view of the parachute shown in Figure 1 with the shroud lines removed;

Figure 3 is a cross-sectional view of the parachute shown in Figures 1 and 2 and taken along line 3—3 of Figure 2;

Figure 4 is a plan view of one of the sections of material as cut to make the parachute shown in Figure 1;

Figure 5 is a top view of another embodiment of my invention showing the straight keel like projection which keeps the parachute from revolving as it descends; and Figure 6 is a cross-sectional view of the embodiment shown in Figure 5 and taken along the line 6—6 of Figure 5.

With reference to the drawing, my invention comprises, in general, a canopy 10 made of a plurality of sections 11 of silk or other suitable material and sewed together along seams 12. As illustrated, I have used 12 sections of material to make my parachute but is to be understood that any number may be used without departing from the scope of my invention. Periphery cords or shroud lines 13 are attached to the peripheral edge 16 of the parachute at the points 14 where the sections of material are sewed together into a seam 12 and cooperate with a center shroud line 21 to suspend a weight 15.

As may be seen in Figure 1, my parachute has a central portion 19 formed down from the top surface 20 of the canopy 10 to a point below the plane described by the peripheral edge 16. The central portion 19 also extends below the folds of the canopy while the parachute is in its folded position. Attached to this central portion which in this embodiment is substantially cone shaped, is a shroud line or cord 21 which cooperates with the periphery shrouds 13 to support the weight 15.

The center and peripheral shrouds may be made of the same materials as are used at present or they may be made of rubber or a combination of resilient and non-resilient materials.

The shroud lengths are adjusted so that upon the parachute opening the center shroud 21 breaks the speed of the falling weight 15 before the peripheral shrouds 13 cooperate. This causes a strong pull on the central portion 19 and a consequent deformation in the canopy as may be seen by the dash-and-dot lines 22 in Figure 1. This deformation in the canopy which is momentary until the peripheral shrouds 13 cooperate to retard the speed of the falling weight 15, results in a shock absorbing effect on the weight 15. The shock to which the weight 15 is subjected may be further absorbed by making the center shroud 21 out of a resilient material or by inserting into the length of the cord a resilient unit such as a spring or a rubber section. The shock may be still further absorbed by making the peripheral cords out of rubber or by inserting therein a resilient section somewhere between the canopy 10 and the weight 15.

As the parachute begins to open the central portion 19, by reason of being conical in shape and having its apex below the plane of the peripheral edge of the folded canopy, forces the air which is rushing upward with respect to the parachute sideways into the loose folds of the parachute thereby forcing them to open rapidly and to their fullest extent. As the parachute continues on down the upwardly rushing air is turned sideways into the side surfaces 23 by the wedge action of the central portion 19. The continual pressure of the air forcing out from the center of the parachute keeps the canopy extended to its greatest diameter.

In parachutes with no central shroud the center of the effort of the parachute is directly above a suspended weight provided the weight is not swinging. The shroud lines attaching that weight to the edge of the parachute are, of necessity, pulling the edges of the parachute toward the center axis of the parachute. This angle is subtended by the radius of the canopy. In a parachute embodying the features of my invention in which the central downwardly formed portion is half the diameter of the canopy, the center of effort is in a circle the center of which is the center of the canopy, and the radius of which is half the radius of the canopy. The angle of the pull tending to decrease the size of the canopy is, therefore, approximately half that of a parachute with no center shroud. It is to be seen, therefore, that my parachute will, by its design, seek to stretch to its greatest diameter and will be able to do so because the angle through which the weight 15 tries to decrease the size by its inward pull is very small.

My parachute is designed to utilize the air which rushes upward with respect to the decending parachute to further extend the parachute to its greatest diameter. In parachutes which have no center shroud the air which the canopy entraps seeks to escape through the top of the canopy directly above the suspended weight thereby tending to bulge the canopy in the center and pull the edges in. My parachute is designed to have the center portion 19 split the upwardly rushing column of air and have the curve portion 27 direct that stream of air sideways into the side surfaces 23 thereby forcing those surfaces as far away from the center of the chute as possible. As the force of the air rushing out from the center portion 19 more than counterbalances the inward pull of the shroud lines, the parachute is maintained at its greatest diameter.

A descending parachute drifts with the wind thereby subjecting the operator to danger of being blown over water, into trees or high tension wires, and into many other dangers. My parachute is designed to obviate this danger by allowing the operator a more positive control than has heretofore been obtained. By pulling in on the center shroud the operator can regulate the speed of his descent and his drift. Hence he can drop short of a dangerous spot or he can drift over it as in his judgment he desires to do. Side slip may be controlled by pulling in on the side shrouds thereby preventing the escape of air on that side with a corresponding slip of the parachute in that direction.

Another danger to which a parachute jumper is subjected is that of being dragged across the ground by an open parachute after a safe landing. At present if a man is being dragged across the ground he tries to gather in several shrouds attached to one side of his parachute and pull them toward himself thereby pulling in that side of the parachute until it no longer catches the wind. This is often hard to do as he is being pulled along the ground and must gather several shrouds and pull them in a substantial distance. With my design this danger will be much less as the operator need only pull the center shroud toward himself and allow the peripheral edge of the parachute to blow away until it no longer can hold the wind. At this point the parachute will drop flat on the ground.

In the embodiment of my invention shown in Figures 5 and 6, I have elongated the central conical portion to provide a straight wedge shaped portion 28 which acts very much as a keel on a boat. It serves the same purposes as the conically shaped portion and also keeps the parachute from turning about on its axis during the descent. The parachute is controlled the same as the parachute in Figures 1, 2, and 3 and opens with the same shock absorbing effect as has been previously described.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A parachute adapted to retard the speed of a falling body comprising an unbroken circular spread of material having downwardly turned edges, a center portion turned downwardly to form a closed wedge-shaped lateralwise protuberance located substantially along one diameter of the unbroken circular spread and inside the parachute as the parachute is in operative position, center shroud means attached to said closed lateralwise protuberance and adapted to hold the body, and peripheral shroud means attached to the downwardly turned edges and adapted in cooperation with the center shroud means to hold the body, said shroud means arranged when the parachute opens to cause the center shrouds attached to the closed lateralwise protuberance to take the weight of the falling body before the peripheral shroud means takes the weight.

2. A parachute adapted to retard the speed of a freely falling body comprising, in combination, a circular spread of material having downwardly turned peripheral edges, a central lateralwise protuberance turned downwardly from said spread of material to form a substantially straight keel to retard the rotation of said parachute and said body, said keel located substantially along a diameter of said circular spread of material and extending below a plane defined by the bottom of the downwardly turned peripheral edge, central weight attaching means fastened to said central lateralwise protuberance, peripheral weight attaching means fastened to the peripheral edge of said spread of material, said weight attaching means arranged as the parachute opens to cause the pull of the freely falling body to be first transmitted to the circular spread of material through the central weight attaching means.

3. A parachute comprising an unbroken spread of material having downwardly turned edges, a center portion turned downwardly to form a closed wedge shaped lateralwise protuberance located substantially along a diameter of the spread of material, peripheral shroud means attached to the downwardly turned edges and adapted to be attached to a person to be suspended, and resilient central shroud means attached to the said wedge shaped protuberance and attached to and adapted to be controlled by the said person to be suspended.

4. A parachute comprising an unbroken spread of material having downwardly turned edges, a center portion turned downwardly to form a closed wedge shaped lateralwise protuberance located substantially along a diameter of the spread of material, peripheral shroud means attached to the downwardly turned edges and adapted to be attached to a weight to be suspended, and shroud means attached to said wedge shaped protuberance and adapted to be attached to the weight to be suspended.

JOHN OVERBEKE.